US008417631B2

(12) United States Patent
Hoffman et al.

(10) Patent No.: US 8,417,631 B2
(45) Date of Patent: *Apr. 9, 2013

(54) SMART CARD LOADING TRANSACTIONS USING WIRELESS TELECOMMUNICATIONS NETWORK

(75) Inventors: Steven R. Hoffman, Pleasanton, CA (US); Suzanne C. Cutino, Reno, NV (US)

(73) Assignee: Visa International Service Association, Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/283,449

(22) Filed: Oct. 27, 2011

(65) Prior Publication Data

US 2012/0136795 A1    May 31, 2012

Related U.S. Application Data

(63) Continuation of application No. 12/246,238, filed on Oct. 6, 2008, now Pat. No. 8,078,532, which is a continuation of application No. 09/587,092, filed on May 31, 2000, now Pat. No. 7,729, 986.

(60) Provisional application No. 60/146,559, filed on Jul. 30, 1999, provisional application No. 60/156,765, filed on Sep. 29, 1999.

(51) Int. Cl.
*G06Q 40/00* (2012.01)
(52) U.S. Cl. ......................................................... 705/39
(58) Field of Classification Search ........................ None
See application file for complete search history.

(56) References Cited

U.S. PATENT DOCUMENTS

| 5,220,501 A | 6/1993 | Lawlor et al. |
| 5,231,569 A | 7/1993 | Myatt et al. |
| 5,428,684 A | 6/1995 | Akiyama et al. |
| 5,461,217 A | 10/1995 | Claus |

(Continued)

FOREIGN PATENT DOCUMENTS

| EP | 0689368 | 12/1995 |
| EP | 0785534 | 7/1997 |

(Continued)

OTHER PUBLICATIONS

Canadian Office Action dated Jun. 2, 2009 in App. No. 2380529.

(Continued)

*Primary Examiner* — Jason M Borlinghaus
(74) *Attorney, Agent, or Firm* — Cooley LLP; Walter G. Hanchuk; Nathan W. Poulsen

(57) ABSTRACT

Smart card transactions allow consumers to load value onto and make purchases using smart cards with a mobile telephone handset over the telecommunications network. To load the smart card, the handset receives a request to load value. The handset generates a funds request message and sends the message to a funds issuer computer that debits a user account. Next, the handset authenticates the smart card and receives a response message including approval to load. The handset validates the response and loads the value onto the smart card. For payment, the handset sends an order request message to the merchant server computer, and in return receives a purchase instruction message. The handset processes the message locally, and sends a draw request message to a payment server computer. The payment server computer sends an approval to debit the smart card. The handset validates the approval and debits the smart card.

16 Claims, 8 Drawing Sheets

U.S. PATENT DOCUMENTS

| | | | |
|---|---|---|---|
| 5,491,693 | A | 2/1996 | Britton et al. |
| 5,649,118 | A | 7/1997 | Carlisle et al. |
| 5,748,737 | A | 5/1998 | Daggar |
| 5,796,832 | A | 8/1998 | Kawan |
| 5,870,724 | A | 2/1999 | Lawlor et al. |
| 5,884,292 | A | 3/1999 | Baker et al. |
| 5,887,266 | A | 3/1999 | Heinonen et al. |
| 5,901,303 | A | 5/1999 | Chew |
| 5,909,485 | A | 6/1999 | Martin et al. |
| 5,915,226 | A | 6/1999 | Martineau |
| 5,930,363 | A | 7/1999 | Stanford et al. |
| 5,936,221 | A | 8/1999 | Corder et al. |
| 5,949,492 | A | 9/1999 | Markovitz |
| 5,952,640 | A | 9/1999 | Lucero |
| 5,969,316 | A | 10/1999 | Greer et al. |
| 6,061,664 | A | 5/2000 | Pieterse et al. |
| 6,072,870 | A | 6/2000 | Nguyen et al. |
| 6,115,601 | A | 9/2000 | Ferreira |
| 6,163,772 | A | 12/2000 | Kramer et al. |
| 6,202,054 | B1 | 3/2001 | Lawlor et al. |
| 6,250,557 | B1 | 6/2001 | Forslund et al. |
| 6,253,027 | B1 | 6/2001 | Weber et al. |
| 6,256,690 | B1 | 7/2001 | Carper |
| 6,282,522 | B1 | 8/2001 | Davis et al. |
| 6,415,142 | B1 | 7/2002 | Martineau |
| 6,434,379 | B1 | 8/2002 | Despres et al. |
| 6,442,532 | B1 | 8/2002 | Kawan |
| 6,463,534 | B1 | 10/2002 | Geiger et al. |
| 6,529,725 | B1 | 3/2003 | Joao et al. |
| 6,885,877 | B1 | 4/2005 | Ozaki et al. |
| 7,249,093 | B1 | 7/2007 | King |
| 7,472,073 | B1 | 12/2008 | Masi |
| 7,702,538 | B2 | 4/2010 | Rau et al. |
| 2002/0112160 | A2 | 8/2002 | Wheeler et al. |
| 2002/0175207 | A1 | 11/2002 | Kashef et al. |
| 2009/0030843 | A1 | 1/2009 | Hoffman et al. |
| 2010/0235282 | A1 | 9/2010 | Hoffman et al. |

FOREIGN PATENT DOCUMENTS

| | | |
|---|---|---|
| EP | 0831438 | 3/1998 |
| WO | 95/04328 | 2/1995 |
| WO | 96/32700 | 10/1996 |
| WO | 97/45814 | 12/1997 |
| WO | 98/11519 | 3/1998 |
| WO | 98/49658 | 11/1998 |
| WO | 98/52151 | 11/1998 |
| WO | 99/00773 | 1/1999 |
| WO | 99/16029 | 4/1999 |
| WO | 99/27505 | 6/1999 |

OTHER PUBLICATIONS

Computer Dictionary, 3rd ed., Microsoft Press, 1997, p. 215.

International Preliminary Examination Report dated Nov. 19, 2001 corresponding to PCT/US00/20151.

International Search Report dated Nov. 1, 2000 corresponding to PCT/US00/20151.

Manterfield, Richard. Telecommunications Signalling. Institution of Electrical Engineers. London, England. Jan. 1, 1999.

"Mondex Unveils GSM Payment Solution at Cartes," Nov. 16, 1999, Mondex International, Press release, http://194.112.42.16/mondex/cgi-bin/printpage.pl?&path=../docume.../newsr1moi.txt&user.

"New Mobile Handset Brings Portable Cashpoint," Nov. 6, 1998, Mondex International, Press release, http:///194.112.42.16/mondex/cgi-bin/printpage.pl?&path=..docume.../newst4wzu.txt&user.

"Proton Smart Cards Used to Recharge Mobile Phone Cards Via the Internet," Feb. 3, 1999, Proton World: Press Release Mar. 20, 1999—Mobile Phone Cards Reload, http://www.protonworld.com/press/release/press15.htm.

Rankl, W. & Effing, W. Smartcard Handbook. Jon Wiley & Sons. West Sussex, England, 1997, pp. 21-23, 327-353 and 362-368.

"The SICAP—System and Basis," Martschitisch, Andreas; ComTec Feb. 1997; pp. 1-5.

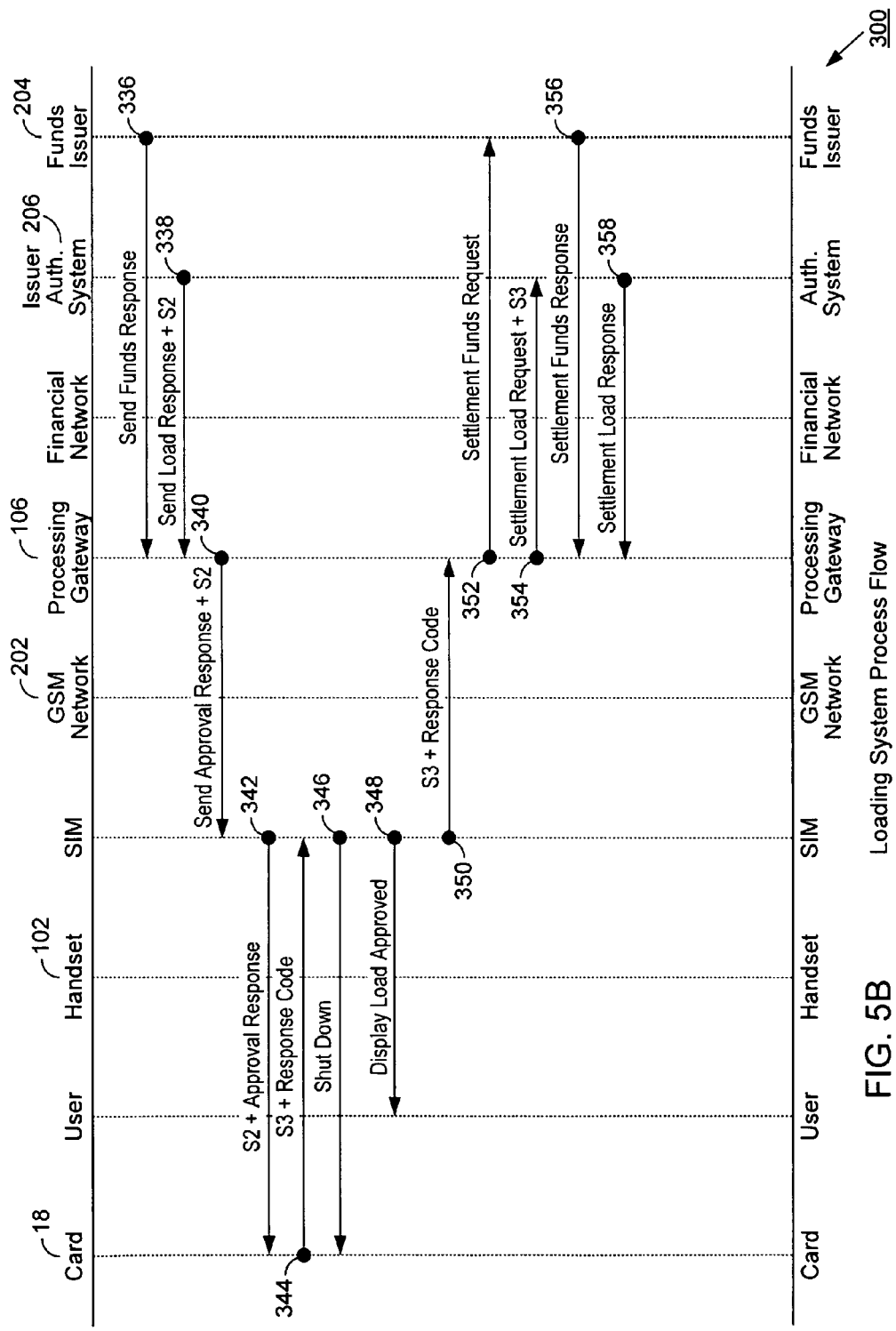
FIG. 5B  Loading System Process Flow

FIG. 7    Purchasing System Process Flow

US 8,417,631 B2

SMART CARD LOADING TRANSACTIONS USING WIRELESS TELECOMMUNICATIONS NETWORK

This application is a continuation of and claims priority under 35 U.S.C. §120 to U.S. patent application No. 12/246,238 filed Oct. 6, 2008 entitled "Smart Card Loading Transactions Using Wireless Telecommunications Network," which in turn is a continuation of and claims priority to U.S. patent application No. 09/587,092 filed May 31, 2000 entitled "Smart Card Transactions Using Wireless Telecommunications Network," which in turn claims priority of U.S. provisional patent applications No. 60/146,559 filed Jul. 30, 1999 and No. 60/156,765, filed Sep. 29, 1999, all of which are hereby incorporated by reference.

FIELD OF THE INVENTION

The present invention relates generally to smart cards. More specifically, the present invention relates to loading value and making purchases using a smart card in conjunction with a mobile telephone.

BACKGROUND OF THE INVENTION

Consumers of today have a need to make low-value cash transactions quickly and efficiently. The above-referenced U.S. patent applications describe techniques whereby a consumer may use a smart card to purchase merchandise over the Internet, to load value over the Internet, to perform transactions using a "virtual" smart card, and to perform transactions using a set-top box, respectively. Even with the above techniques, though, there is still a need to use a smart card for low-value cash transactions in other scenarios.

In the prior art, consumers have only been able to load value onto a smart card at a fixed device such as an automated teller machine (ATM) or a personal computer connected to the Internet and having a card reader. Consumers these days, however, are extremely mobile (whether in their car or traveling on business) and may desire to load value onto a smart card in many different situations. A consumer may not always have access to an ATM or a personal computer with an Internet connection. For example, a driver pulling up to a parking meter that accepts a smart card for payment may discover that he or she has no value left on the smart card. If there are no ATMs nearby, it will be difficult for this person to load value onto the smart card in order to use the parking meter.

FIG. 1 illustrates a prior art loading technique 10. In this technique a loading device such as an ATM 14 is used by a consumer to load value onto a smart card 18. ATM 14 is a sophisticated smart card terminal that includes not only a smart card reader, but also a hardware processor and software used to implement the loading of value onto smart card 18. As such, ATM 14 is an integrated unit as it includes both the card reader and the processor. As previously explained, it is not always convenient for a consumer to find an ATM in order to load value onto a smart card.

Similarly, consumers may wish to purchase goods and services at other times than when they are sitting in front of their computer at home. For example, a consumer may wish to purchase airtime for a mobile telephone (handset), directions for driving, and other services such as take-out food, theater tickets, traffic reports and stock purchases while they are in transit.

FIG. 2 illustrates a prior art technique 20 for making a purchase using a smart card. Using this technique, a consumer uses a purchase terminal 22 located at a merchant in order to make a purchase using smart card 18. Terminal 22 includes not only a card reader but also a hardware processor and software for decrementing value from card 18. As such, terminal 22 is also an integrated unit in that it includes both the card reader and processor. As previously mentioned, a consumer may wish to make a purchase using a smart card at other times than when the consumer is at a merchant location.

As such, there is a need for these consumers to be able to load value and to purchase goods and services when the consumer is mobile.

A company named Newcom has implemented a dual subscriber identification module (SIM) for use in a mobile telephone that allows a consumer to swap SIMs. In other words, a consumer may swap a second SIM to provide a new identity for the telephone. This technique, however, is unique to a SIM and is not used for loading value or making a purchase using a smart card. The technique implemented by Newcom only relates to changing the identity of a telephone. As a telephone is essentially a dumb terminal, there are significant challenges to be overcome should a mobile telephone be used in conjunction with smart card transactions.

Therefore, a system and technique are desirable that would allow a consumer to perform smart card transactions using a mobile telephone.

SUMMARY OF THE INVENTION

To achieve the foregoing, and in accordance with the purpose of the present invention, a system and technique are disclosed that allow a consumer to load value onto a smart card and to make purchases using a smart card with a mobile telephone handset.

In a first embodiment, a technique allows the loading of value over a telecommunications network onto a smart card. The mobile telephone handset receives a request from a user to load a value onto the smart card. The handset then generates a funds request message which includes the value and sends the funds request message over the telecommunications network to a funds issuer computer. The funds issuer computer debits an account associated with the user. Next, the handset generates a load request message with a cryptographic signature and sends the load request message over the telecommunications network to an authentication computer which authenticates the smart card. The handset receives a response message which includes a cryptographic signature and an approval to load. Finally, the handset validates the second cryptographic signature and loads the value onto the smart card.

In a second embodiment, a technique allows the purchasing of an item over a telecommunications network using a mobile telephone handset. First, the handset sends an order request message to a merchant server computer, and in return receives a purchase instruction message. The handset processes the purchase instruction message locally, and then sends a draw request message over the telecommunications network to a payment server computer. The payment server computer sends a debit message which includes a cryptographic signature and an approval to debit the smart card. Finally, the handset validates the cryptographic signature and debits the smart card, thus the item may be released to a user associated with said smart card.

With the explosive growth in mobile telephones over the past several years, a growing number of consumers have access to wireless networks. At the same time, the electronic distribution of goods and services to consumers has also increased. This merchandise includes digitally-delivered goods such as directions, electronic tickets, electronic coupons, games and information, as well as prepaid telephone service. The present invention brings the convenience of electronic cash to consumers and makes it available through their mobile telephones for purchase of such merchandise.

The present invention brings smart card transactions to the wireless world. It provides a load and purchase solution for low-value transactions offering consumers a wireless equivalent to cash and coins. Offering loading and purchasing through a mobile telephone provides cardholders the convenience of loading and purchasing without geographic limitation.

By integrating defined chip commands with the Short Message Service (SMS) channel, the handset becomes a remote terminal load and purchase device. SMS is a wireless processing protocol capable of sending alphanumeric messages. Chip commands are implemented as special alphanumeric messages in a defined format, containing security data that use SMS as the communications channel. SMS is used as a delivery mechanism that allows users to place data in an "envelope" to be sent and "opened" by a destination. Chip commands are integrated by being placed in the envelope and opened by the recipient.

The present invention provides numerous benefits for consumers, banks, merchants and telecommunications service providers.

For consumers, the present invention provides a simple, easy-to-use, portable way to pay for goods and services over a wireless network. A smart card can be loaded through a network using the cardholder's handset, putting a wireless ATM in every pocket or purse. The smart card can also be used in both physical and wireless merchant locations to make purchases. Consumer privacy and anonymity is protected throughout the transaction process.

For banks, the present invention provides new mobile banking revenue and merchant marketing opportunities. Also, a low-value payment solution is provided without introducing a separate product or brand or requiring a bank to implement significant systems changes.

For merchants, the present invention provides a payment solution for low-value transactions, enabling merchants to offer a wider range of digital merchandise. Also, wireless merchants are provided with access to an existing and growing base of cardholders.

For operators of a wireless network, the value of the network is increased through new over-the-air revenue and merchant marketing opportunities. Recently, wireless networks have become sensitive to month-end consumer billing "sticker shock." The present invention offers a pay-as-you-go solution to wireless networks without introducing a separate product or brand. In addition, the present invention integrates into existing wireless networks technologies using the SMS channel.

BRIEF DESCRIPTION OF THE DRAWINGS

The invention, together with further advantages thereof, may best be understood by reference to the following description taken in conjunction with the accompanying drawings in which:

FIGS. 5A and 5B illustrates a process flow for the loading system of FIG. 4.

DETAILED DESCRIPTION OF THE INVENTION

Figure 1:
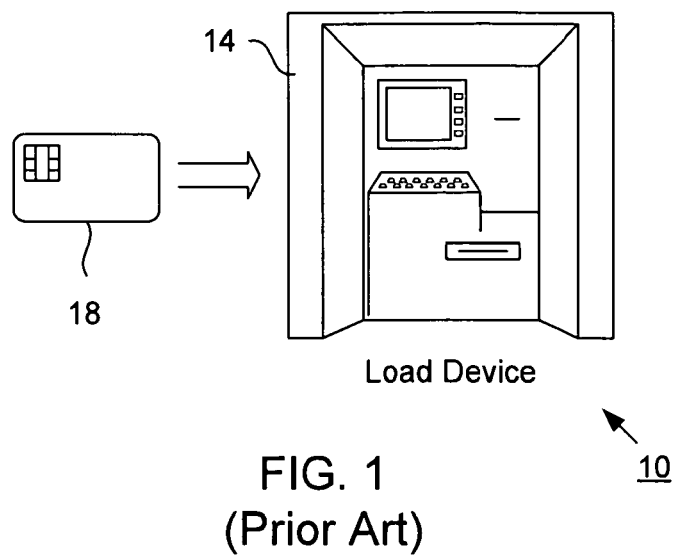
FIG. 1 illustrates a prior art smart card loading technique.
Figure 2:
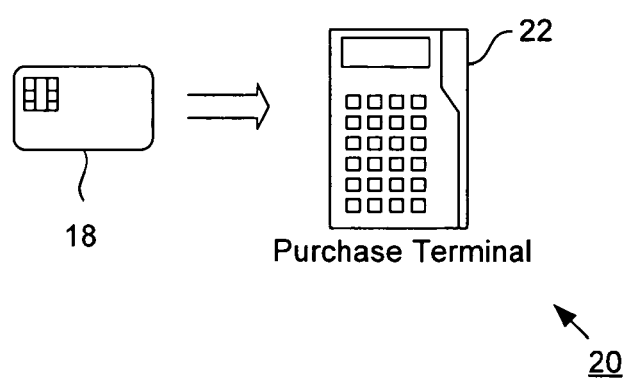
FIG. 2 illustrates a prior art technique for making a purchase using a smart card.
Figure 3:
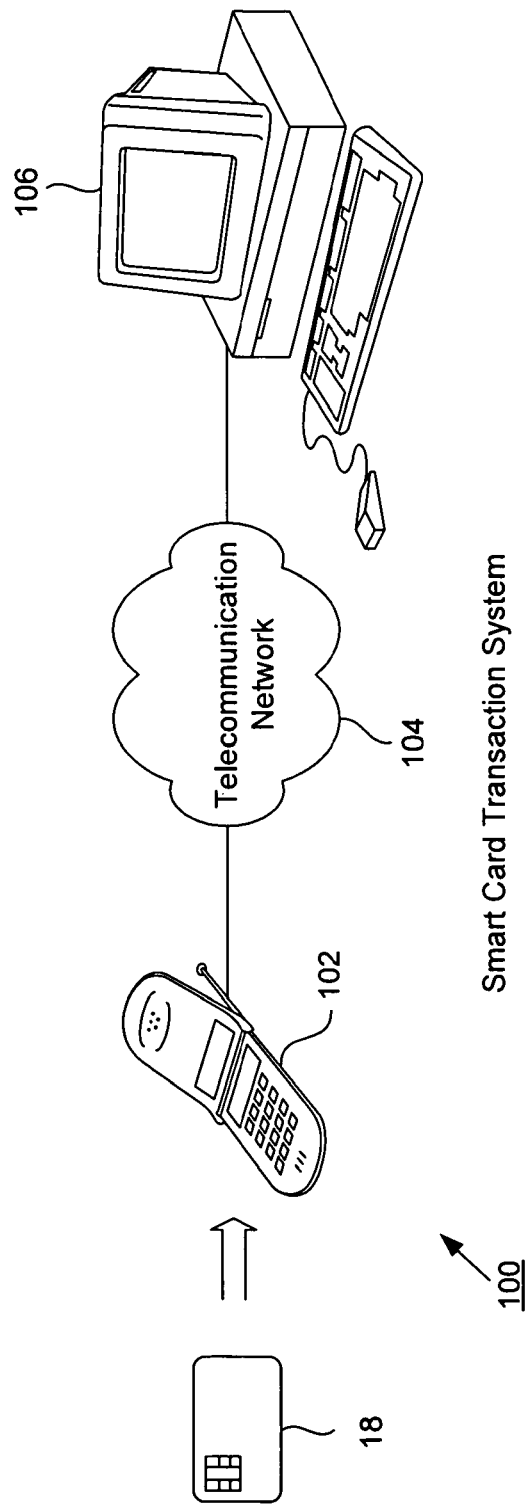
FIG. 3 illustrates a smart card transaction system according to one embodiment of the invention.

FIG. 3 illustrates a smart card transaction system 100 according to one embodiment of the invention. This high level diagram illustrates that system 100 includes a mobile telephone 102 (also referred to as a wireless telephone, cellular telephone or handset), a smart card 18 able to be inserted into the handset, a telecommunications network 104 and a server computer 106 (which may be connected to other computers and/or communications networks). Thus, as opposed to the prior art loading and purchasing techniques shown in FIGS. 1 and 2 in which integrated units are used, FIG. 3 illustrates a distributed system in which the card reader is present within handset 102 and processing occurs at a remote location at server 106 or elsewhere.

Handset 102 is any suitable mobile telephone that incorporates a smart card reader for reading smart card 18. Implementation of a card reader inside a handset can be accomplished by those of skill in the art. In a preferred embodiment, system 100 uses the Europay-Mastercard-Visa (EMV) standard is which case handset 102 is any handset that can read EMV smart cards and the card reader is an EMV-compliant smart card reader. The EMV standard is a known, published standard for implementing the electromechanical interactions between a smart card and a card reader. Handset 102 may be preprogrammed with screens of information used to prompt the user or to give information to the user; alternatively, these screens may be downloaded via server 106. In a specific embodiment, the Motorola StarTAC D mobile telephone is used to implement the invention, and uses the Motorola StarTAC mobile smart card terminal (MST). Handset 102 also includes a subscriber identification module (SIM) which are well-known in the art. In a specific embodiment, the SIMphonIC JAVA SIM available from De la Rue is used.

Smart card 18 is typically an ISO 7816 credit card-sized plastic card that includes one or more semiconductor integrated circuits. Also termed "chip cards," integrated circuit cards, memory cards or processor cards, a smart card can interface with a point-of-sale terminal, an ATM, or with a card reader integrated within a computer, telephone, vending machine, or a variety of other devices. The smart card may be programmed with various types of functionality such as a stored-value application, a credit or debit application, a loyalty application, cardholder information, etc. Although a plastic card is currently the medium of choice for smart cards, it is contemplated that a smart card may also be implemented in a smaller form factor. For example, it may attach to a key chain or be embedded in a subscriber identification module (SIM) or application-specific integrated circuit (ASIC).

A smart card may include a microprocessor, random access memory (RAM), read-only memory (ROM), non-volatile memory, an encryption module (or arithmetic unit), and a card reader (or terminal) interface. Other features may be present such as optical storage, flash EEPROM, FRAM, a clock, a random number generator, interrupt control, control logic, a charge pump, power connections, and interface contacts that allow the card to communicate with the outside world. Of course, a smart card may be implemented in many ways, and need not necessarily include a microprocessor or other features.

The microprocessor is any suitable central processing unit for executing commands and controlling the device. RAM serves as temporary storage for calculated results and as stack memory. ROM stores the operating system, fixed data, standard routines, look up tables and other permanent information. Non-volatile memory (such as EPROM or EEPROM) serves to store information that must not be lost when the card is disconnected from a power source, and must also be alterable to accommodate data specific to individual cards or changes possible over the card lifetime. This information includes a card identification number, a personal identification number, authorization levels, cash balances, credit limits, and other information that may need to change over time. An encryption module is an optional hardware module used for performing a variety of encryption algorithms. Of course, encryption may also be performed in software. *Applied Cryptography*, Bruce Schneier, John Wiley & Sons, Inc., 1996 discusses suitable encryption algorithms and is hereby incorporated by reference.

The card reader interface includes the software and hardware necessary for communication with the outside world. A wide variety of interfaces are possible. By way of example, the interface may provide a contact interface, a close-coupled interface, a remote-coupled interface, or a variety of other interfaces. With a contact interface, signals from the integrated circuit are routed to a number of metal contacts on the outside of the card which come in physical contact with similar contacts of a card reader device. A smart card may include a traditional magnetic stripe to provide compatibility with traditional card reader devices and applications, and may also provide a copy of the magnetic stripe information within the integrated circuit itself for compatibility.

Various mechanical and electrical characteristics of a smart card and aspects of its interaction with a card reader device are described in *Smart Card Handbook*, W. Rankl and W. Effing, John Wiley & Sons, Ltd., 1997, and are defined by the following specifications, all of which are incorporated herein by reference: *Visa Integrated Circuit Card Specification*, Visa International Service Association, 1996; *EMV Integrated Circuit Card Specification for Payment Systems, EMV Integrated Circuit Card Terminal Specification for Payment Systems, EMV Integrated Circuit Card Application Specification for Payment Systems*, Visa International, Mastercard, Europay, 1996; and *International Standard; Identification Cards—Integrated Circuit*(s) *Cards with Contacts, Parts* 1-6, International Organization for Standardization, 1987-1995.

Telecommunications network 104 is any suitable wireless network implementing a particular protocol for allowing communication with handset 102. In general, any wireless application protocol (WAP) may be used. By way of example, the wireless technologies that may be used to implement telecommunications network 104 are GSM (global system for mobile communications), CDMA (code division multiple access), TDMA (time division multiple access), AMPS (advanced mobile telephone service), and PCS (personal communications service).

In the preferred embodiment, the GSM technology is used to implement network 104 to allow communication with handset 102. As is known in the art, GSM technology includes a voice channel and a data channel. The data channel is also termed the Short Message Service (SMS) channel and is used by the present invention to transfer information pertinent to smart card transactions. SMS is a wireless processing protocol capable of sending alphanumeric messages.

By integrating defined chip commands with the SMS channel, the handset becomes a remote terminal load and purchase device. Chip commands are implemented as special alphanumeric messages in a defined format, containing security data that use SMS as the communications channel. SMS is used as a delivery mechanism that allows users to place data in an "envelope" to be sent and "opened" by a destination. Chip commands are integrated by being placed in the envelope and opened by the recipient. In other embodiments, the chip commands may be implemented in any suitable fashion, depending upon the protocol used.

Server 106 is a server computer as will be explained in more detail below. Server 106 includes hardware and software for processing smart card transactions and may be any suitable computer implementing any suitable operating system. Computer 106 may be stand alone, or may also be connected to other processing computers and financial networks.

Smart Card Loading System

Figure 4:
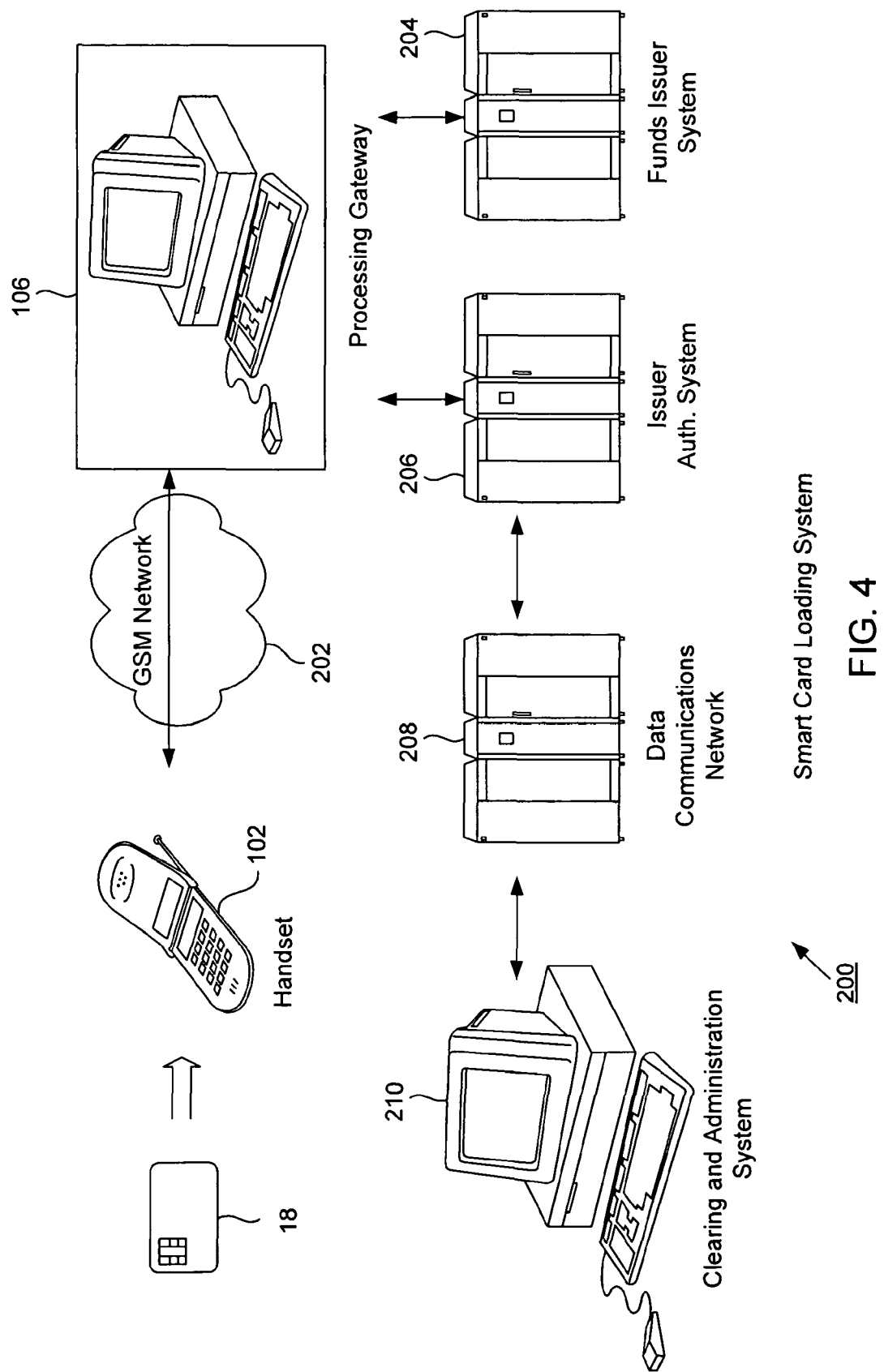
FIG. 4 illustrates a smart card loading system according to one embodiment of the invention.

FIG. 4 illustrates a smart card loading system 200 according to one embodiment of the invention. System 200 separates a loading transaction into local cardholder functions (using handset 102) and remote bank functions (occurring under the control of processing server 106). The local cardholder functions occurring at handset 102 include the interface to the inserted smart card 18, a display for providing the user with information and for accepting commands, the ability to select a load amount, and accept/cancel options. The remote banking functions include validating the transaction, securing funds, authenticating the transaction with the issuer and storing the transaction.

Handset 102 includes an EMV smart card reader, a keypad, a display, a subscriber identification module (SIM) and short message service (SMS) wireless capability. A SIM is a well known multi-application smart card chip located in the handset that identifies the user to the GSM network 202, and converts and encrypts voice to data. It also contains both load and purchase software applications to interface between the card/card reader and processing server 106. SMS is a data processing channel of the GSM protocol that carries commands, instructions and electronic product delivery.

In this embodiment, telecommunications network 104 is a GSM network 202 and is used as the communications channel to link the user's handset 102 with processing server 106 and the systems located downstream from it.

Processing gateway 106 is a server computer that includes software for conducting load transactions. Gateway 106 communicates with handset 102, funds issuer system 204 and issuer authentication system 206. After the user selects a load transaction, funds issuer system 204 sends an instruction to processing gateway 106 that contains necessary funding information. Gateway 106 acts as a router processing load commands between the smart card and issuer authentication system 206, and between authentication system 206 and funds issuer system 204. In one embodiment, communication between server 106 and systems 204 and 206 takes place over any suitable financial network, although communication between the entities may also occur over the Internet or other similar networks.

Funds issuer system 204 offers a bank's remote banking transactions to a user through GSM network 202. Issuer system 204 operates to secure funds from a particular source and can operate to electronically withdraw cash from any suitable consumer account. For example, should the user load value onto smart card 18 using system 200, funds issuer system 204 may operate to electronically withdraw the same dollar amount from a consumer checking account at the user's bank.

Issuer authentication system 206 allows an issuer to take liability for funds coming from funds issuer system 116 and any subsequent purchases made with the smart card. Fundamentally, system 206 is arranged to authenticate smart card 18 using a secret key and can generate a response that is then verified by card 18 before value is loaded onto the card.

Data communications network 208 provides secure communications between systems 204/206 and clearing and administration system 210. Data communications network 208 may be any suitable communications network that allows secure communication between computers. For example, communication via media such as telephone lines, cable, fiber optic, microwave, satellite, etc., may be used. Existing networks using secure links such as ATM networks, the Internet or propriety networks may be used. In one embodiment of the invention, network 208 is implemented using VisaNet, an existing global clearing and settlement system provided by Visa International Service Association of Foster City, Calif.

Clearing and administration system 210 settles accounts between banks involving a cardholder's use of a smart card. In the case of a cardholder loading value onto a smart card, processing gateway 106 originates settlements for loading transactions. When a cardholder loads value onto a card, gateway 106 debits funds issuer system 204 and credits issuer authentication system 206. System 206 then advises clearing and administration system 110 through data communications network 208 for audit and card balance maintenance. System 210 maintains a value for each card within transaction system 100 by keeping a database that includes an identifier for each card and the current value of the card. When the card is incremented or decremented in value, the card's value in the database is adjusted accordingly.

Once the cardholder uses the value on the card to purchase merchandise from a merchant, the card is decremented and the merchant submits a request to its bank (the acquiring bank) for payment. Clearing and administration system 210 then transfers a lump sum to the acquiring bank using a suitable settlement service to pay the various merchants having a relationship with the acquirer. Based upon previous collection data, the acquirer then transfers an appropriate amount of money to each merchant reflecting the value of the goods and/or services that that merchant had provided that day to cardholders based upon deductions from their smart cards. Clearing and administration system may be implemented in many ways. Well-known systems that may be used include the clearing and administration system used by Visa International Service Association of Foster City, Calif.

Figure 5A:
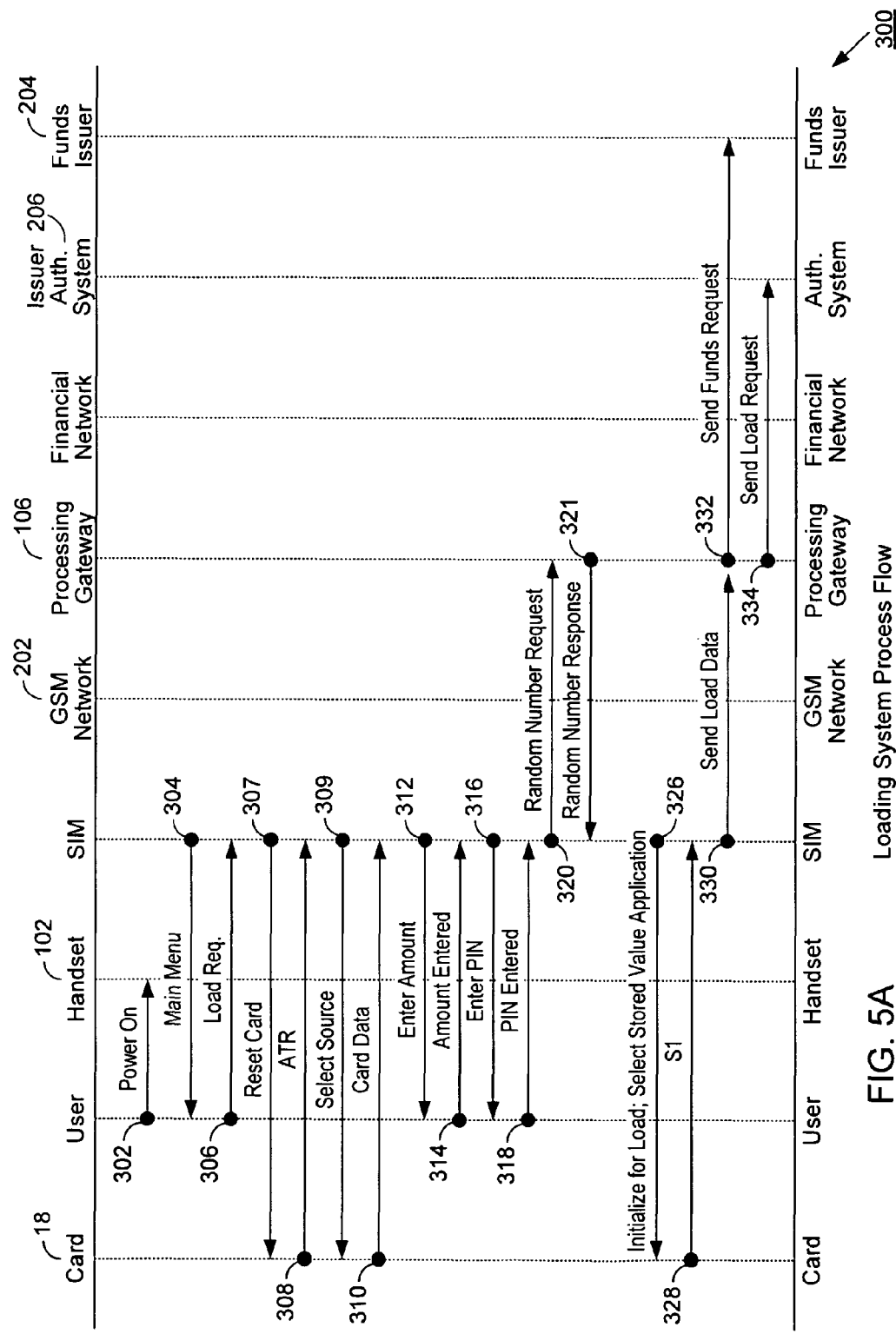

FIG. 5A illustrates a process flow 300 for the loading system of FIG. 4. Flow 300 describes one embodiment by which card 18 is loaded with value using GSM network 202. In one embodiment, processing gateway 106 uses a different message format and protocol between the SIM and the authentication and funds issuer systems. For loading, communication between the SIM and processing gateway 106 may take place using a protocol as defined by Motorola, De la Rue and Logica plc in one particular implementation of specifications published by Visa International. Communication between the gateway and the issuer authentication and funds issuer systems preferably uses the Visa ISO 8583 message format.

In step 302 user turns on handset 102 which responds by presenting a main menu in step 304 via the SIM present within the handset. In step 306 the user requests that a load occur using the handset. In step 307 the handset prompts the cardholder to insert a smart card and the SIM issues a reset card instruction to the card to open the smart card application. The smart card responds in step 308 with an ATR (Answer to Reset) response indicating the application is open. In step 309 the SIM determines the funding account information, the amount of value already present in the stored value application, and the maximum value that may be loaded. This card data is returned to the handset in step 310. In step 312 the user is prompted to enter the amount to be loaded. In step 314 the user enters an amount to be loaded. In one scenario, if a user desires to load more than the maximum amount or if a load would put the card's value over the maximum amount, the load request may be turned down.

The cardholder is next prompted to provide account information. The user's account number (from which the funds will be withdrawn) may be entered by the user at this point (in a home banking funding scenario) or the funding account number may be read off of the smart card. When read off of the smart card, the funding account number is taken from magnetic strip image (MSI) data stored onto the smart card. The user's account number may also be obtained by reading a separate application on the same smart card or by reading an application on a different smart card (as described below). Funding account information may also reside elsewhere as in a separate application in the SIM or on file at the telecommunications network.

In step 316 the user is also prompted to enter a code number (personal identification number) or password which is entered in step 318. In step 320 the smart card issues a request for a random number from processing server 106. This random number will be used to form a cryptographic signature within the card that can be used to authenticate the card. The random number is requested from the processing gateway for higher security. In step 321, a suitable random number is returned to the SIM in the handset. In step 326 the SIM sends an Initialize For Load command to the card containing the random number which creates a cryptographic signature S1 and returns it to the SIM.

Cryptographic signatures are generated during load and purchase operations to authenticate the entities involved or to confirm that operations have occurred. A cryptographic signature termed "S1" is used during a load operation and is typically generated by the smart card. A signature "S2" is used during a load or purchase operation and is generated by the issuer or a payment server. A signature "S3" is generated by the smart card on occurrence of a load or debit and is the final signature that confirms that the card has either loaded value onto, or debited value from, itself.

Cryptographic signatures are well-known in the art and may be created in any suitable manner. Preferably, signatures S1, S2 and/or S3 are created using a cryptographic key shared between the card and the issuer, data unique to the current transaction (including the random number), and data unique to the card. Preferably, the funding account number, card number, PIN or password, and all S1, S2 or S3 signatures are encrypted under 128-bit triple DES between the SIM and the processing gateway, and again with different 128-bit triple DES keys between processing gateway 106 and the issuer authentication and funds issuer systems.

In step 330 the SIM sends a Load Request (including signature S1) and a Funds Request (including PIN or password), collectively "load data," to processing gateway 106. The Load Request message may include a variety of information and preferably includes the card signature S1, the card number, an expiry date, and a load amount. Other information such as a security algorithm, transaction counter, current card balance, and smart card number are also preferably provided. All of this information is prepackaged into a single Load Request message. The Funds Request message preferably includes the amount of funds to be loaded, the funding account number and the PIN or password.

In step 332 the processing gateway sends the Funds Request to funds issuer system 204 which determines (using the funding account number and the amount to be withdrawn) whether or not the user's account has enough funds to load the amount desired onto smart card 18. Verification of the PIN or password also occurs. If there are enough funds, in step 336 the funds issuer sends a Funds Response (which includes an approval code) back to processing gateway 106. In step 334 the Load Request is sent from processing gateway 106 to issuer authentication system 206. This Load Request is essentially an authentication request that contains signature S1. Authentication system 206 accepts the request, validates the card and S1 data, and responds with a Load Response (including an approval) and a cryptographic signature S2 used for verification by the smart card in step 338.

In step 340, assuming steps 336 and 338 are approvals, the processing gateway receives the Funds Response and Load Response with S2 and in turn, sends a single Approval Response with S2 to the SIM in the handset. In step 342 the SIM sends the Approval Response with S2 to card 18. The smart card then validates signature S2 and loads value onto the card corresponding to the requested amount. The card then generates a Load Confirmation message (including a Response Code) and a cryptographic completion signature S3. Signature S3 serves as proof for irrepudiation purposes. In step 346 a shutdown is performed by closing the smart card application.

In step 348 a message is displayed to the user indicating that the load has been approved and the previous value on the card has been incremented to a new value. In step 350 the SIM sends the Response Code and signature S3 to processing gateway 106 for logging and final validation. In step 352 the processing gateway issues a Settlement Funds Request to funds issuer 204 in order to commence debiting the cardholder account and transferring liability from the funds issuer for the authorized debit. In step 354 the processing gateway also issues a Settlement Load Request including the signature S3 to authentication system 206 in order to commence crediting the issuer authentication system and transferring liability to the issuer authentication system for the authorized credit. In step 356 the funds issuer system issues a Settlement Funds Response to the 352 Funds Settlement Request that completes debiting the cardholder account and transferring liability from the funds issuer for the authorized debit. In step 358 the authentication system issues a Settlement Load Response that completes crediting the issuer authentication system and transferring liability to the issuer authentication system for the authorized credit.

Flow 300 illustrates how cryptographic signatures, S1, S2 and S3 are used to authenticate a smart card to an issuer authentication system. Other techniques for implementing process flow 300 may also be used. For a multi-application smart card that includes credit, debit and/or stored-value applications, it may be desirable to more securely authenticate the funds that are available. For example, it may be desirable to authenticate a smart card with funds issuer system 204. In this embodiment, an authorization request certificate (ARQC) and an authentication response certificate (ARPC) allow the funds issuer to authenticate the card and vice-versa, with a final resulting transaction certificate (TC) produced by the smart card to serve for irrepudiation purposes. In this scenario, a credit or debit application on a multi-application smart card is being used as the source of funds and makes use of the ARQC, ARPC and TC in a similar manner as is served with the S1, S2 and S3 cryptographic signatures. Preferably, implementation of both the ARQC and ARPC is done with accordance the document *Visa Integrated Circuit Card Specification* referenced above.

In this scenario, the following steps would occur after step 318 and before step 320, preferably. First, the stored-value application on the multi-application smart card is temporarily shut down in order to open up another application on the smart card such as the credit or debit application. The opened application creates a Funds Request including an ARQC cryptographic signature. The ARQC is a cryptogram that uses a key known only to the funds issuer, transaction data including a random number, the card number and the requested debit amount. The Funds Request and the ARQC are sent by the SIM to processing gateway 106 which passes them on to funds issuer 204. Funds issuer 204 authenticates that the smart card and application are valid, and then formulates an authentication response certificate (ARPC).

The ARPC is a cryptogram that uses a key known only to the smart card application. It is created from the ARQC and transaction data including the response code. As part of a Funds Response message, the funds issuer includes the ARPC to the processing gateway 106 which passes it to the smart card via the SIM. Finally, the smart card validates the ARPC that authenticates that the funds issuer system approved the request message. At this point, the card may continue with the process of loading the dollar amount onto the card. Alternatively, as the approval from funds issuer 204 is independent of a load, the amount approved may also be applied toward a purchase or other use. Control would now return to step 320 of FIG. 5A for the stored value load.

Smart Card Purchasing System

Figure 6:
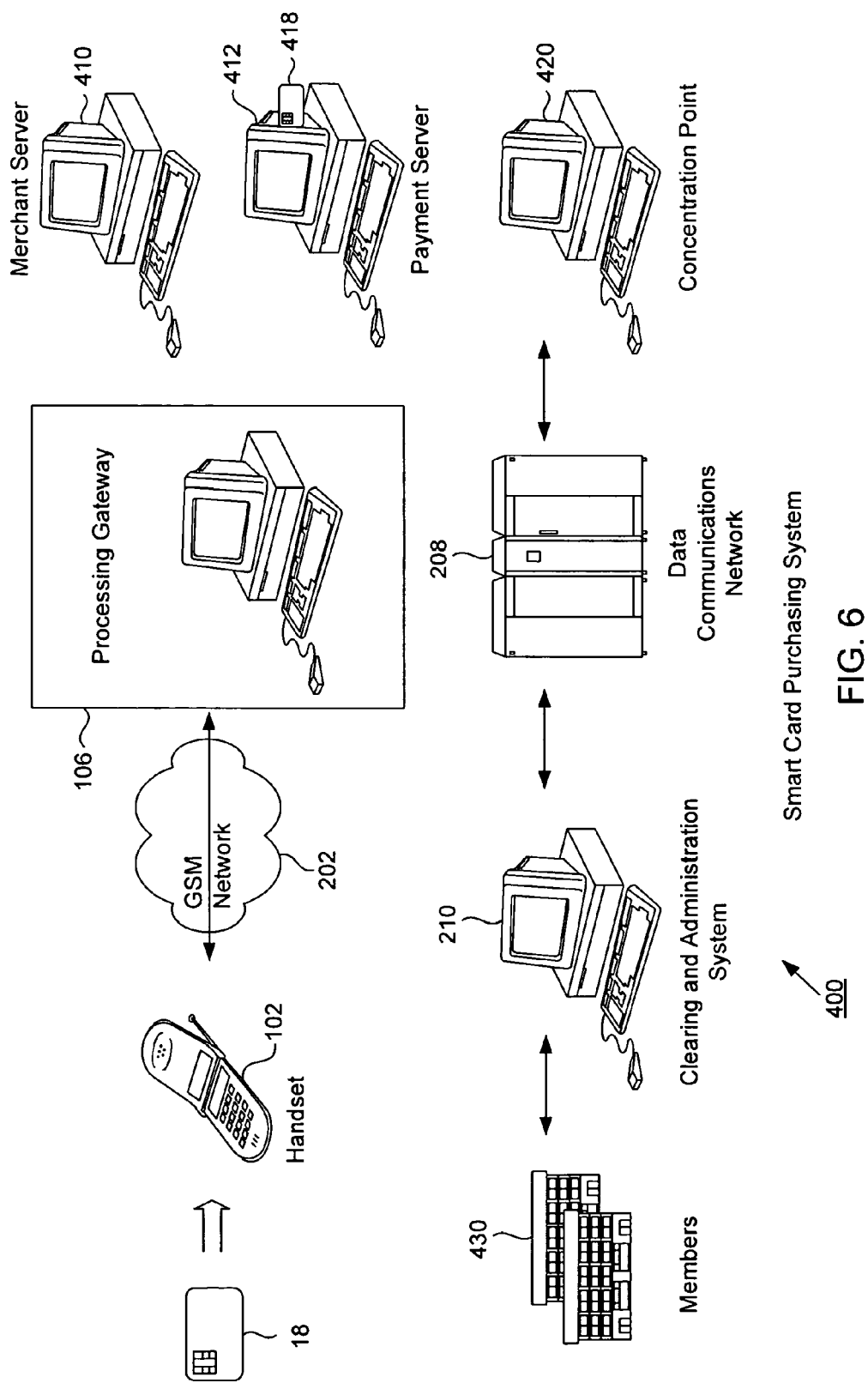
FIG. 6 illustrates a smart card purchasing system according to one embodiment of the invention.

FIG. 6 illustrates a smart card purchasing system 400. Purchasing system 400 separates a purchase transaction into local cardholder and remote merchant functions. Local cardholder functions include a smart card interface, a handset display and accept/cancel options. Remote merchant functions include validation of the transaction, communication with central systems and storing the transactions. GSM network 202 is a communications channel that links handset 102, merchant server 410 and payment server 412, via gateway 106.

Various of the components of FIG. 6 have previously been described in FIG. 4. In addition, merchant server 410 is any suitable computer that offers the user a product or a service over the GSM network to be displayed on handset 102. Payment server 412 includes a merchant's computer hardware, physical terminal logic, a security card 418 and a modem. The terminal logic and security card 418 store transaction information and manage the security of the transaction by validating the integrity of the user's smart card 18. Payment server 412 securely stores the transactions and manages the transmission of the transactions to a concentration point computer 420. From the concentration point, the transactions are sent to a central clearing and administration system 210 for validation, clearing and settlement via data communications network 208.

Processing gateway 106 acts as a router for processing purchase commands and instructions between card 18 and payment server 412 and between payment server 412 and merchant server 410. Members 430 are various member banks and other financial institutions that act as acquirer or issuer within system 400.

Figure 7:
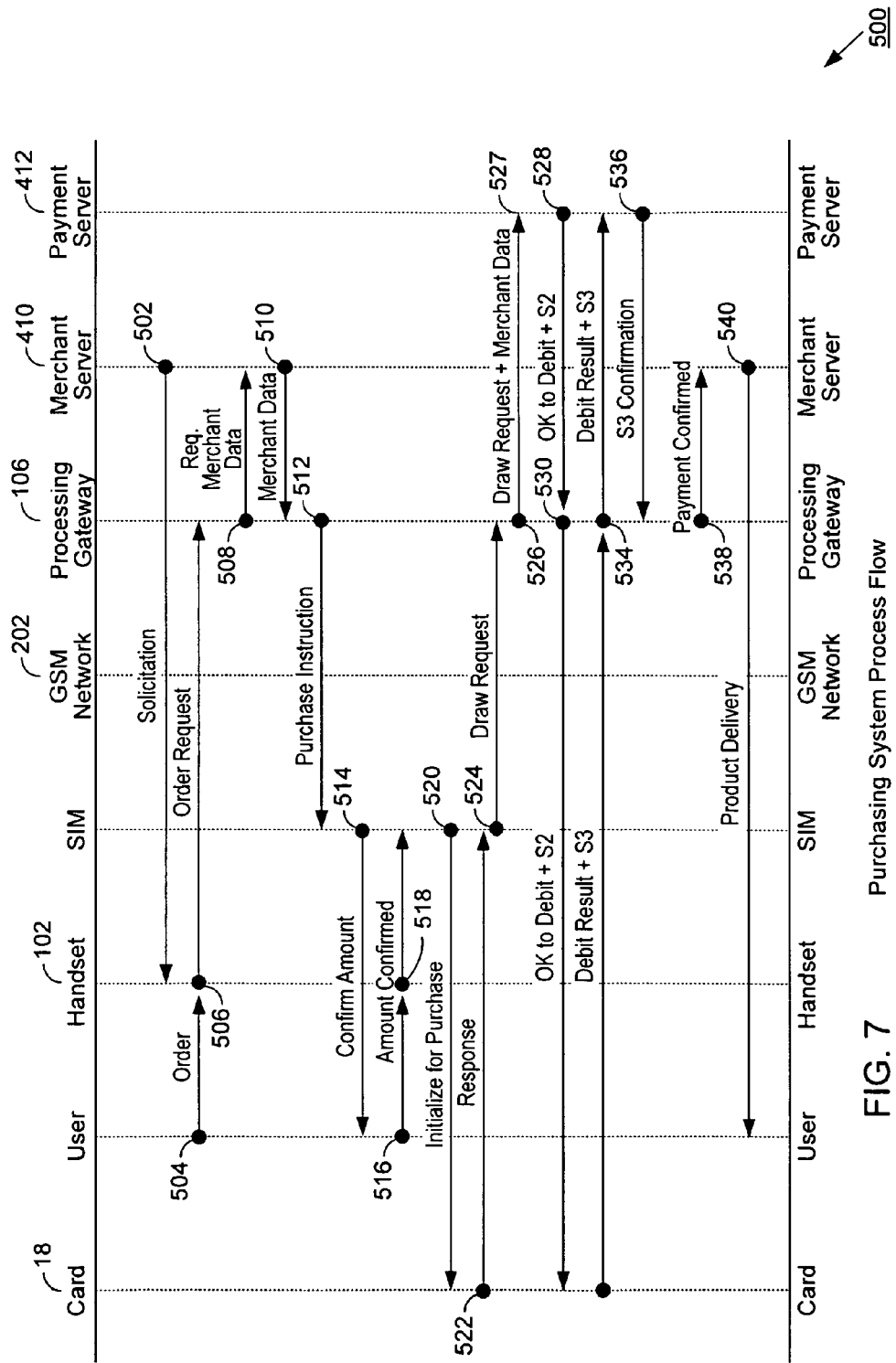
FIG. 7 illustrates a process flow for the purchasing system of FIG. 6.

FIG. 7 illustrates a process flow 500 for the purchasing system of FIG. 6. This flow describes one embodiment using the GSM network. Through process flow 500, a user with a handset may order and pay for products and/or services via handset 102 using a smart card stored value application.

In one embodiment, processing gateway 106 uses a different message format and protocol between the SIM and the upstream systems. For purchase, communication between the SIM and processing gateway 106 may take place using a protocol as defined by Motorola, De la Rue and Logica plc in one particular implementation of specifications published by Visa International. Communication between the gateway and the upstream systems preferably is implemented as described in U.S. patent applications Nos. 08/951,614 and 09/070,488 referenced above.

In step 502 a merchant solicits a user to purchase products and/or services by a solicitation message from merchant server 410 via gateway 106 and GSM network 202 to handset 102. Alternatively, a user may use the handset and its menu to access merchant server 410 to view or list products and/or services for purchase. In step 504 the user uses the displays and keys of the handset to place an order for a product or service. In step 506 the handset sends the order request to processing gateway 106. In step 508 the gateway sends the request to merchant server 410 along with a request for specific merchant data. This merchant data includes a merchant identifier and transaction identifier.

In step 510 the merchant transmits a wireless application protocol markup language (WML) page or other formatted message that includes the merchant data to gateway 106. In step 512 the gateway formulates a purchase instruction that includes the item to be purchased, its amount, the merchant identifier and transaction identifier and sends the instruction to the SIM in the handset. In step 514 the SIM displays a confirmation screen to the user who in step 516 confirms the item and the amount for purchase. In step 518 the handset sends this confirmation on to the SIM. The handset then in step 520 sends an Initialize For Purchase message (that includes a reset command) to card 18. In step 522 the card sends a Response To Initialize for Purchase message (which includes an ATR) back to the SIM.

In step 524 the SIM formulates a Draw Request including the card number, the amount and the merchant data. The Draw Request is then sent on to gateway 106. In step 526 the Draw Request is sent to payment server 412 along with merchant data. Next in step 527, the payment server processes the draw request in conjunction with associated security card 418 as will be explained in greater detail below.

The payment server then receives an OK to Debit command and a security card signature S2 from the security card. The security card signature S2 is a value that uniquely identifies and validates security card 418 to prove to card 18 that the incoming debit command is a valid command from a real security card. This validation ensures that when the smart card is debited the financial totals in the security card are updated. Thus, the user of the smart card is guaranteed that a valid debit of the card has occurred. In a preferred embodiment of the invention, signature S2 is an encrypted value ensuring that no other entity can forge an identity of a security card.

In step 528 the payment server sends the OK to Debit command along with the signature S2 to gateway 106. Gateway 106, in turn, sends OK to Debit and S2 to card 18 in step 530 for the card to debit itself. Upon receiving the OK to Debit command and S2, card 18 verifies signature S2, debits itself by the purchase amount, and also generates a Debit Result message (presumed to be successful) and a card signature S3. The card signature S3 is a unique value identifying a valid smart card. In a preferred embodiment of the invention, this signature is in encrypted form to prevent tampering. If the card does not have enough value to satisfy the purchase amount, then the Debit Result message indicates as such. In step 532, card 18 sends the Debit Result message along with signature S3 back to gateway 106. At this point, the purchase amount has been deducted from the balance on card 18. Next, in step 534, the gateway sends Debit Result and S3 to payment server 412.

The payment server then directs this received message to security card 418. The security card processes this message and verifies the received card signature S3. As the security card contains the keys and algorithms necessary to compute card signatures, the security card is able to validate that a received card signature is in fact a valid one by comparing this card signature with a generated expected value. A successful comparison indicates that a successful Debit Result message received from the card is in fact a valid success message and that the card has been debited. An error result code or a comparison that is not successful potentially indicates that the card has not been debited by the proper amount. This comparison of card signatures by the security card ensures that a smart card is in fact debited before merchant server 410 is directed to release the purchased merchandise. Assuming that the transaction is so far valid, the security card sends a Confirmation message back to the payment server which is relayed in step 536 to the gateway.

In step 538 gateway 106 passes the Confirmation message on to merchant server 410. The merchant server registers this message and checks for success. The merchant server calls a validate routine with the Confirmation message to validate the message. The validate routine takes the transaction identifier along with the encrypted Confirmation message to decrypt the Confirmation message. If the decrypted Confirmation message is acceptable, the merchant server then determines that a successful transaction has occurred. The merchant server then delivers the purchased electronic information to handset 102, or mails a product to the user. Alternatively, the merchant server may generate an electronic purchase receipt to deliver to the handset indicating goods and/or services to be rendered.

Computer System Embodiment

Figure 8:
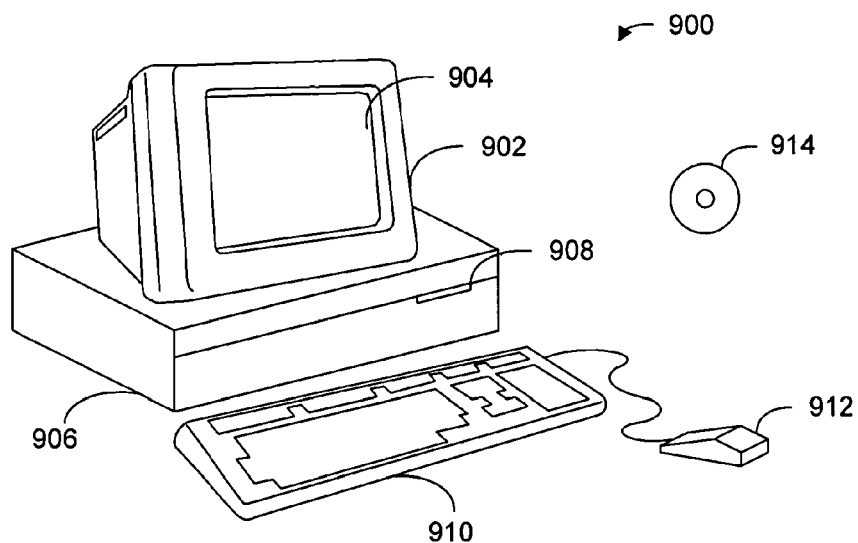
FIGS. 8 and 9 illustrate a computer system suitable for implementing embodiments of the present invention.
Figure 9:
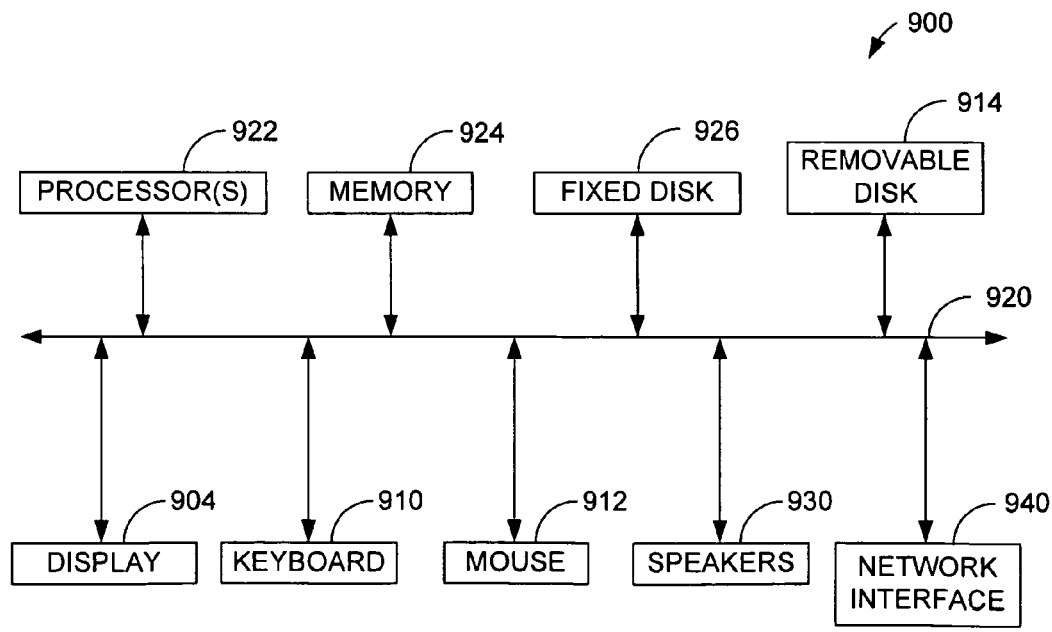

FIGS. 8 and 9 illustrate a computer system 900 suitable for implementing embodiments of the present invention. FIG. 8 shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 9 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. An apparatus, comprising:
   a memory;
   a processor disposed in communication with said memory, and configured to issue a plurality of processing instructions stored in the memory, wherein the processor issues instructions to:
   send a funds request message from said handset to a bank system that controls an account of said user, said funds request message including a load value and a funding account identifier that identifies said account of said user;
   send a funds response message from said bank system to said handset indicating an approval to debit said user account by said load value;
   send a load request message from said handset to an issuer system, said load request message including a first cryptographic signature, wherein said first cryptographic signature is generated using a first cryptographic key shared between said smart card and an issuer of said smart card;
   validate said first cryptographic signature by said issuer system and authenticating said smart card;
   send a load response message from said issuer system to said handset including a second cryptographic signature, wherein said second cryptographic signature is generated using a second cryptographic key shared between said smart card and said issuer of said smart card;
   validate, by said smart card, said second cryptographic signature; and
   load said load value into a stored-value application of said smart card.

2. The apparatus as recited in claim 1 further comprising instructions to:
   debit said user account of said bank system by said load value; and
   credit said issuer system by said load value, whereby liability for said load value is transferred to said issuer system.

3. The apparatus as recited in claim 1 further comprising instructions to:
   increment a value of said smart card in a database of an administration system computer by said load value, wherein said incremented value in said database reflects the value of said stored-value application of said smart card.

4. The apparatus as recited in claim 1 further comprising instructions to:
   process said funds request message, said funds response message, said load request message and said load response message by a gateway computer located between said handset and said bank system and between said handset and said issuer system, wherein said gateway computer uses a different message protocol for communication with said handset than with said bank system and said issuer system.

5. The apparatus as recited in claim 1 further comprising instructions to:
   generate, by said smart card, a cryptographic signature $S_3$ using a third cryptographic key shared between said smart card and said issuer of said smart card;
   send a settlement funds request message over said network from said handset to said bank system to effect the debiting of said user account of said bank system by said load value;
   and
   send a settlement load request message that includes said cryptographic signature $S_3$ over said network from said handset to said issuer system to effect the crediting of said issuer system by said load value, whereby liability for said load value is transferred to said issuer system.

6. The apparatus as recited in claim 1, wherein said smart card may be disconnected from said handset without affecting the telecommunications functionality of said handset.

7. The apparatus as recited in claim 1 further comprising instructions to:
   receive a request from said user at said handset to load said load value; and
   prompt said user to place said smart card into communication with said handset using a card reader interface.

8. The apparatus as recited in claim 1, wherein said first cryptographic key and said second cryptographic key are the same key.

9. A processor-readable non-transitory medium storing processor-executable instructions to:
- send a funds request message from said handset to a bank system that controls an account of said user, said funds request message including a load value and a funding account identifier that identifies said account of said user;
- send a funds response message from said bank system to said handset indicating an approval to debit said user account by said load value;
- send a load request message from said handset to an issuer system, said load request message including a first cryptographic signature, wherein said first cryptographic signature is generated using a first cryptographic key shared between said smart card and an issuer of said smart card;
- validate said first cryptographic signature by said issuer system and authenticating said smart card;
- send a load response message from said issuer system to said handset including a second cryptographic signature, wherein said second cryptographic signature is generated using a second cryptographic key shared between said smart card and said issuer of said smart card;
- validate, by said smart card, said second cryptographic signature; and
- load said load value into a stored-value application of said smart card.

10. The medium of claim 9 further comprising instructions to:
- debit said user account of said bank system by said load value; and
- credit said issuer system by said load value, whereby liability for said load value is transferred to said issuer system.

11. The medium of claim 9 further comprising instructions to:
- increment a value of said smart card in a database of an administration system computer by said load value, wherein said incremented value in said database reflects the value of said stored-value application of said smart card.

12. The medium of claim 9 further comprising instructions to:
- process said funds request message, said funds response message, said load request message and said load response message by a gateway computer located between said handset and said bank system and between said handset and said issuer system, wherein said gateway computer uses a different message protocol for communication with said handset than with said bank system and said issuer system.

13. The medium of claim 9 further comprising instructions to:
- generate, by said smart card, a cryptographic signature $S_3$ using a third cryptographic key shared between said smart card and said issuer of said smart card;
- send a settlement funds request message over said network from said handset to said bank system to effect the debiting of said user account of said bank system by said load value; and
- send a settlement load request message that includes said cryptographic signature $S_3$ over said network from said handset to said issuer system to effect the crediting of said issuer system by said load value, whereby liability for said load value is transferred to said issuer system.

14. The medium of claim 9, wherein said smart card may be disconnected from said handset without affecting the telecommunications functionality of said handset.

15. The medium of claim 9 further comprising instructions to:
- receive a request from said user at said handset to load said load value; and
- prompt said user to place said smart card into communication with said handset using a card reader interface.

16. The medium of claim 9, wherein said first cryptographic key and said second cryptographic key are the same key.

* * * * *